(12) United States Patent
Deng et al.

(10) Patent No.: US 11,431,882 B2
(45) Date of Patent: Aug. 30, 2022

(54) CAMERA MODULE AND ASSEMBLING METHOD THEREFOR

(71) Applicant: JIANGXI LIANYI OPTICS CO., LTD., Nanchang (CN)

(72) Inventors: Binquan Deng, Nanchang (CN); Xinyu Xiong, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 111 days.

(21) Appl. No.: 17/038,038

(22) Filed: Sep. 30, 2020

(65) Prior Publication Data

US 2021/0037172 A1    Feb. 4, 2021

Related U.S. Application Data

(63) Continuation-in-part of application No. PCT/CN2019/107929, filed on Sep. 25, 2019.

(30) Foreign Application Priority Data

Jul. 29, 2019 (CN) .......................... 201910690860.5

(51) Int. Cl.
*H04N 5/225* (2006.01)
*G02B 7/02* (2021.01)

(52) U.S. Cl.
CPC ........... *H04N 5/2254* (2013.01); *G02B 7/022* (2013.01); *H04N 5/2253* (2013.01)

(58) Field of Classification Search
CPC .. H04N 5/2254; H04N 5/2253; H04N 5/2251; G02B 7/022; H04M 1/0264
See application file for complete search history.

(56) References Cited

U.S. PATENT DOCUMENTS

2007/0217039 A1    9/2007 Chang
2009/0002825 A1    1/2009 Morita et al.
(Continued)

FOREIGN PATENT DOCUMENTS

CN    101291427 A    10/2008
CN    102033285 A    4/2011
(Continued)

OTHER PUBLICATIONS

International search report issued in a corresponding International application No. PCT/CN2019/107929, dated Apr. 26, 2020 (7 pages).
(Continued)

*Primary Examiner* — Padma Haliyur (57) ABSTRACT

The disclosure provides a camera module and an assembling method therefor. The camera module includes a lens, a holder, an image sensor assembly, and one or more self-locking screws for fixing the lens, the holder and the image sensor assembly. The holder is provided with a lens mounting hole for assembling the lens and one or more screw holes for assembling the one or more self-locking screws. The holder includes a supporting platform, a location guiding sleeve and internal threads. The lens (100) includes external threads engaged with the internal threads, a location guiding step cooperated with the location guiding sleeve, and a limiting ring cooperated with the supporting platform.

20 Claims, 5 Drawing Sheets

(56) References Cited

U.S. PATENT DOCUMENTS

| | | | | |
|---|---|---|---|---|
| 2010/0194974 | A1* | 8/2010 | Hoshikawa | G03B 17/14 |
| | | | | 348/373 |
| 2017/0299947 | A1 | 10/2017 | Nakamura et al. | |
| 2017/0307841 | A1* | 10/2017 | Nakamura | G03B 43/00 |
| 2019/0098184 | A1* | 3/2019 | An | H04N 5/2254 |
| 2020/0124945 | A1* | 4/2020 | Kim | G03B 17/12 |

FOREIGN PATENT DOCUMENTS

| | | |
|---|---|---|
| CN | 103513383 A | 1/2014 |
| CN | 105892001 A | 8/2016 |
| CN | 107147834 A | 9/2017 |
| CN | 107422446 A | 12/2017 |
| CN | 108462823 A | 8/2018 |
| CN | 109239882 A | 1/2019 |
| CN | 208782913 U | 4/2019 |
| CN | 109819146 A | 5/2019 |
| CN | 208907938 U | 5/2019 |
| EP | 3280127 A1 | 2/2018 |
| EP | 3306907 A1 | 4/2018 |

OTHER PUBLICATIONS

Written opinion of the international search authority issued in a corresponding International application No. PCT/CN2019/107929, dated Apr. 26, 2020 (6 pages).

First office action issued in a corresponding Chinese application No. 201910690860.5, dated Dec. 24, 2019 (14 pages).

Second office action issued in a corresponding Chinese application No. 201910690860.5, dated Mar. 10, 2020 (12 pages).

Chinese search report issued in a corresponding Chinese application No. 201910690860.5, dated Dec. 13, 2019 (4 pages).

EPO, European Office Action for EP Application No. 19939731.6, dated Jan. 21, 2022.

* cited by examiner

CAMERA MODULE AND ASSEMBLING METHOD THEREFOR

CROSS REFERENCE TO RELATED APPLICATION

This application is a continuation-in-part of PCT Application Serial No. PCT/CN2019/107929, filed on Sep. 25, 2019, entitled "CAMERA MODULE AND ASSEMBLING METHOD THEREFOR", the entire disclosure of which is incorporated herein by reference. The PCT application claims priority to Chinese patent application No. 201910690860.5, filed Jul. 29, 2019, titled "CAMERA MODULE AND ASSEMBLING METHOD THEREFOR", the entire disclosure of which is incorporated herein by reference.

TECHNICAL FIELD

The present disclosure relates to the field of lens imaging technologies, and more particularly, to a camera module and assembling method therefor.

BACKGROUND

Camera modules generally include a lens, a holder and an image sensor assembly. During assembling processes, how to property assemble the above-mentioned components is a research direction for relevant technicians.

SUMMARY

The main object of the disclosure is to provide a camera module and an assembling method therefor, to solve the problem that there may be a risk of loosening, either between a lens and a holder, or between the holder and an image sensor assembly, thereby facilitating the assembly of the lens module.

Another object of the disclosure is to provide an assembling method for a camera module, to solve the problem that a requirement for the position of an optical axis relative to a positioning reference of a holder is too high when the holder is used as an assembly reference.

The embodiments of the disclosure achieve the above objects through the following technical solutions.

In a first aspect, the disclosure provides a camera module. The camera module comprises a holder, a lens, an image sensor assembly, and one or more self-locking screws. The holder comprises a first surface and a second surface, the first surface and the second surface are opposite; the holder further comprises an inner side wall, the inner side wall defines a lens mounting hole, the lens mounting hole penetrates through the first surface and the second surface, the lens mounting hole is configured for mounting the lens; the holder defines one or more screw holes for mounting the one or more self-locking screws; the holder further comprises a supporting platform, a location guiding sleeve and internal threads, the supporting platform, the location guiding sleeve and the internal threads are formed on the inner side wall and arranged along a direction from the first surface to the second surface, the supporting platform is formed by recessing from the first surface toward the second surface. The lens comprises an outer side wall, external threads, a location guiding step and a limit ring, the external threads, the location guiding step and the limit ring are disposed on the outer side wall, the external threads cooperate with the internal threads, the location guiding step is mounted in the location guiding sleeve, the limit ring is mounted on the supporting platform. The image sensor assembly is attached on the second surface. The one or more self-locking screws are configured for fixing the lens to the holder and fixing the holder and the image sensor assembly.

In a second aspect, the disclosure further provides an assembling method for a camera module. The assembling method comprise the follow:

providing a holder, wherein the holder comprises a first surface and a second surface, the first surface and the second surface are opposite; the holder further comprises an inner side wall, the inner side wall defines a lens mounting hole, the lens mounting hole penetrates through the first surface and the second surface; the holder defines one or more screw holes for mounting the one or more self-locking screws; the holder further comprises a supporting platform, a location guiding sleeve and internal threads, the supporting platform, the location guiding sleeve and the internal threads are formed on the inner side wall and arranged along a direction from the first surface to the second surface, the supporting platform is formed by recessing from the first surface toward the second surface;

providing a lens, wherein the lens comprises an outer side wall, external threads, a location guiding step and a limit ring, the external threads, the location guiding step and the limit ring are disposed on the outer side wall, the location guiding step is positioned between the external threads and the limit ring, the limit ring comprises a third surface and a fourth surface, the third surface faces the location guiding step, and the third surface and the fourth surface are opposite;

screwing the lens into the lens mounting hole through the location guiding sleeve, wherein the external threads and the internal threads are cooperatively tightened, the lens and the holder are clamped in an axial direction when the third surface of the limit ring abuts against the supporting platform;

providing one or more first self-locking screws and screwing the one or more first self-locking screws into corresponding screw holes of the holder, wherein the lens is fixedly mounted on the holder when the first self-locking screws abut against the fourth surface of the limit ring;

providing an image sensor and a circuit board and assembling the image sensor on a surface of the circuit board, thereby assembling an image sensor assembly;

arranging the image sensor assembly on the second surface of the holder and filling glue between the image sensor assembly and the holder, thereby enabling the image sensor to be accommodated in the lens mounting hole, adjusting the position of the image sensor assembly, thereby enabling the focus of the lens to be coincided with the center of the image sensor and an optical axis of the lens to be coincided with the central normal of the image sensor;

baking and curing the glue between the image sensor assembly and the holder, and providing one or more second self-locking screws, passing the one or more second self-locking screws through the image sensor assembly and screwing corresponding screw holes of the holder, filling adhesive medium between the one or more second self-locking screws and the image sensor assembly to form an elastic connection, attaching the image sensor assembly onto the holder through the one or more second self-locking screws, thereby realizing the assembly of the camera module.

Compared with the related at, the camera module and the assembling method for the camera module at least have the following advantages:

(1) Components of conventional camera modules are assembled based on a surface of the circuit board, however, they are assembled based on the holder in the application. This reduces flatness and centrality requirements of the image sensor installed on the circuit board, and further effectively reduces the assembly difficulty and facilitates manufacturing.

(2) Self-locking screws are used in the application, this can effectively avoid the problem of glue failure caused by vibration, high temperature, etc., ensure that the lens and the image sensor assembly both are stably engaged with the holder, and facilitates rework, repair and other later processes.

(3) In the assembly processes of the camera module, the lens is firstly assembled with the holder, so it is ensured that the optical axis of the lens is consistent with respect to the reference position of positioning posts of the holder, and the consistency of the camera module assembled with an imaging device is also ensured.

(4) The assembly processes of the camera module effectively improve the coaxiality between the center normal of the image sensor and the optical axis of the lens, that is, the optical axis of the lens coincides with the normal of the image sensor, thereby improving the yield of the camera module.

REFERENCE NUMERALS OF MAIN COMPONENTS

| | | | |
|---|---|---|---|
| Camera module | 10 | Lens | 100 |
| Limit ring | 101 | Location guiding step | 102 |
| External threads | 103 | Third surface | 104 |
| Fourth surface | 105 | Outer side wall | 106 |
| Holder | 200 | Positioning post | 201 |
| First screw hole | 202 | Supporting platform | 203 |
| Location guiding sleeve | 204 | Internal threads | 205 |
| Second screw hole | 206 | First surface | 207 |
| Second surface | 208 | Annular boss | 209 |
| Inner side wall | 210 | Image sensor assembly | 300 |
| Image sensor | 301 | Through hole | 302 |
| Circuit board | 303 | First self-locking screw | 400 |
| Second self-locking screw | 500 | lens group | 120 |
| barrel | 110 | positioning part | 113 |
| exposed part | 111 | limit part | 112 |
| main portion | 115 | screw part | 114 |
| nut part | 401 | Screwing part | 402 |
| main body | 210 | abutting boss | 220 |
| attaching boss | 230 | aligning portion | 240 |
| lens mounting hole | 250 | supporting portion | 251 |
| positioning portion | 252 | screw portion | 253 |
| receiving portion | 254 | First supporting surface | 255 |
| Second supporting surface | 256 | Third supporting surface | 257 |

DETAILED DESCRIPTION OF PREFERRED EMBODIMENTS

In order to better understand the disclosure, a more comprehensive description is provided below with reference to the accompanying drawings. The drawings illustrate several embodiments of the disclosure. The disclosure can be implemented in many different ways and is not limited to these embodiments. Instead, the purpose of providing these embodiments is to make the disclosure more thorough and comprehensive.

Unless defined, all technical and scientific terms used herein have the same meaning as commonly understood by those skilled in the art. These terms used in the description herein are only for the purpose of describing specific embodiments, and are not intended to limit the description. The term "and/or" as used herein includes any and all selections including one or more related listed items.

Camera modules on the market generally include a lens, a holder, and an image sensor assembly. How to assemble the above components, while ensuring the requirements of optical performance and the positional relationship of assembled components, has always been a research direction for those skilled in the art. In the related art, assembling processes include the follows. First an image sensor is mounted to a circuit board through surface mounted technology (SMT) to form an image sensor assembly, then a holder and the image sensor assembly are mounted through bonding, the lens and the holder are mounted through screwing, and then the position of the lens is fine-tuned through auto-focusing technology, so that the focus of the lens falls on the center of the image sensor, finally an optical axis of the lens is enabled to coincide with the center normal of the image sensor through auto-centering technology.

However, the applicant found through research that there are many shortcomings in the above-mentioned assembling processes. On one hand, since the holder, the image sensor assembly, and the lens are fixed by glue, this fixing manner completely relies on the glue bonding strength, which may result in the risk of the image sensor assembly falling off easily. During the assembling processes, the glue after dispensing is not processed by other treatment, it may cause the glue to easily rub against other components and drop residues, so that the image sensor and other devices may be polluted and the imaging quality may be affected. In addition, it is difficult to dispense glue, and the amount of the glue is hard to control.

On the other hand, the flatness of the circuit board is relatively low due to that the circuit board is easily deformed and warped when temperature changes, and the image sensor has body tolerance and SMT tolerance, these reasons result in poor position accuracy of the image sensor mounted on the circuit board. In order to ensure that the focus of the lens falls on the center of the image sensor and the optical axis of the lens coincides with the center normal of the image sensor, the lens is required to be adjusted through auto-focusing technology and auto-centering technology, however, such adjustment will cause the positioning datum of the optical axis of the lens and the positioning datum of a positioning post of the holder are inconsistent, resulting in that mass-produced camera modules are inconsistency. Further, when the customer assembling the camera module, the positioning post are used as the datum, it may cause the camera module has poor optical performance when assembled on a device product.

Therefore, it is necessary to design a camera module structure with high accuracy in the relative position of the optical axis of the lens, the datum of the holder, and the center normal of the image sensor, and optimize a camera module assembling method that enables the lens, the holder and the image sensor assembly connected with high strength, are convenient to be assembled, are not easy to fall off, and do not cause pollution to the image sensor to affect imaging quality.

Figure 1:
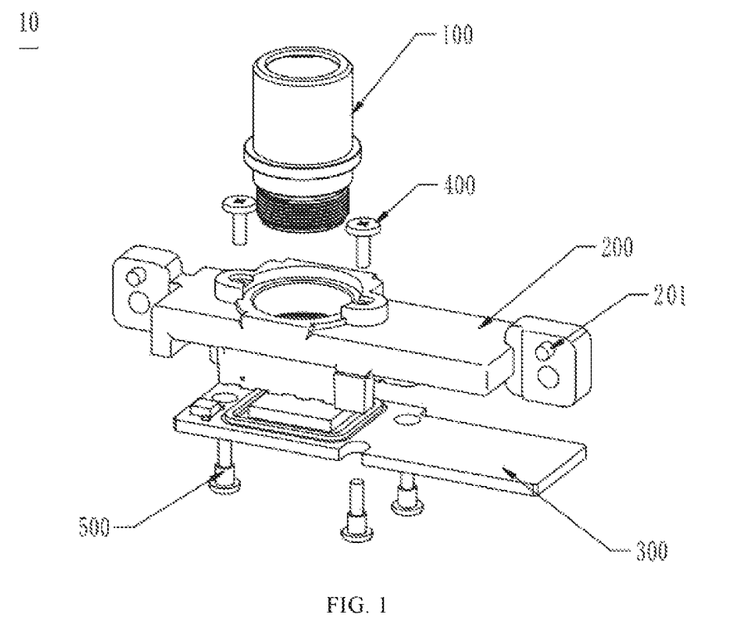
FIG. 1 is a schematic exploded diagram of a camera module according to an embodiment of the disclosure.

FIG. 1 illustrates an exploded schematic diagram of a camera module 10 according to an embodiment of the disclosure. The camera module 10 has particular requirements for positioning datum, an optical axis is required to be coincided with the normal of an image sensor and to meet size requirements relative to the positioning datum.

Specifically, the camera module 10 includes a lens 100, a holder 200, an image sensor assembly 300, and one or more self-locking screws. The holder 200 is configured to mount the lens 100. The image sensor assembly 300 is attached and mounted on the holder 200. The self-locking screws are configured to fix the lens 100 and the image sensor assembly 300 on the holder 200.

Figure 2:
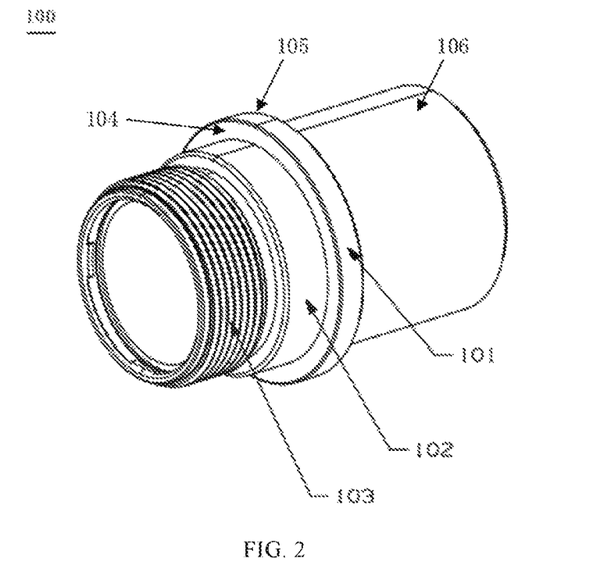
FIG. 2 is a schematic structural diagram showing the structure of a lens of the camera module, according to an embodiment of the disclosure.

Specifically, FIG. 2 illustrates a schematic structural diagram of the lens 100 of the disclosure. The lens 100 includes an outer side wall 106, external threads 103, a location guiding step 102 and a limit ring 101. The external threads 103, the location guiding step 102 and the limit ring 101 are disposed on the outer side wall 106, in other words, the external threads 103, the location guiding step 102 and the limit ring 101 are provided at an outer surface of the lens 100. The location guiding step 102 is positioned between the threads 103 and the limit ring 101. The limit ring 101 is substantially disposed at the middle of the lens 100 and protrudes outward from the location guiding step 102. The limit ring 101 includes a third surface 104 and a fourth surface 105 opposite to the third surface 104. The external threads 103 extend from an end of the outer surface of the lens 100 toward the location guiding step 102. The terms related to the orientation in the embodiment, such as the term "middle", take the relative position between the structures in the figure as a reference standard.

In the embodiment, the location guiding step 102 is provided to ensure that the lens 100 is smoothly screwed into a lens mounting hole of the holder 200. The limit ring 101, protruding outward from the positioning guide step 102, is provided to ensure that the lens 100 stops to a proper position after being screwed into the holder 200, thereby avoiding inconsistent flange focal distances of products.

Figure 3:
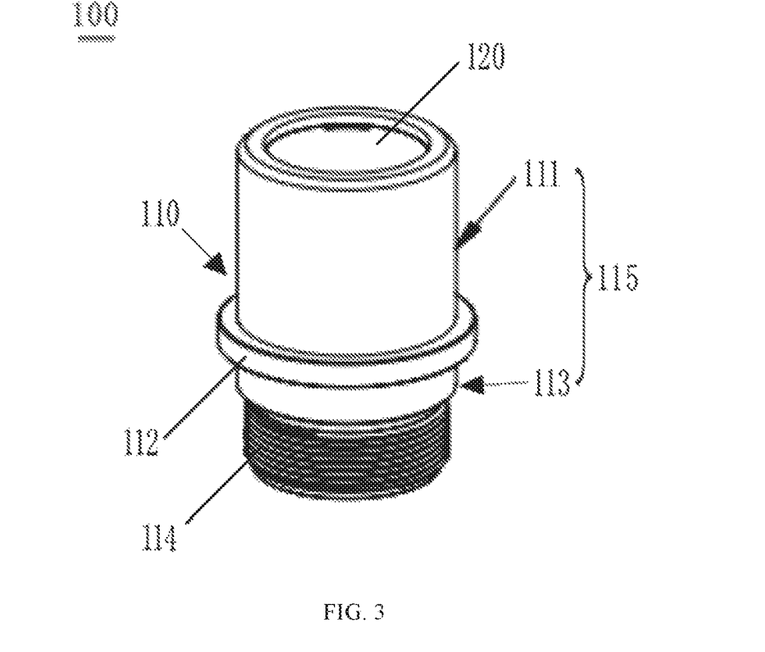
FIG. 3 is a schematic structural diagram showing the structure of the lens of the camera module, from another aspect, according to an embodiment of the disclosure.

As shown in FIG. 3, the structure of the lens 100 can also be described as follows. The lens 100 includes a barrel 110 and a lens group 120, the lens group 120 is accommodated in the barrel 110. The barrel 110 includes a screw part 114, a main portion 115 and a limit part 112, the screw part 115 is connected at a bottom of the main portion 115, the limit part 112 protrudes from an outer surface of the main portion 115. The limit part 112 may be the limit ring 101, may also be any other protrusion in different structure or shape. The main portion 115 includes an exposed part 111 and a positioning part 113 respectively located at two opposite sides of the limit part 112. A diameter of the limit part 112 is greater than that of the main portion 115, a diameter of the main portion 115 is greater than that of the screw part 114.

Figure 4:
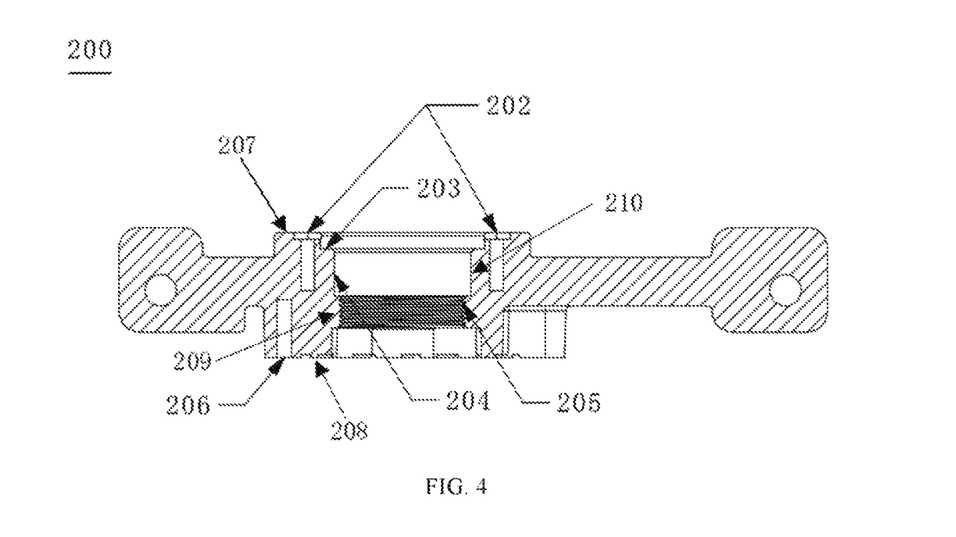
FIG. 4 is a cross-sectional diagram showing a holder of the camera module, according to an embodiment of the disclosure.

FIG. 4 illustrates a cross-sectional view of the holder 200 according to an embodiment of the disclosure. The holder 200 includes a first surface 207 and a second surface 208 opposite to the first surface 207. The holder 200 further includes an inner side wall 210, the inner side wall 210 defines and forms the lens mounting hole, and the lens mounting hole penetrates through from the first surface 207 to the second surface 208. The holder 200 is provided with one or more screw holes, and the screw holes are configured to install the self-locking screws. The screw holes include one or more first screw holes 202 and one or more second screw holes 206. The first screw holes 202 are defined in the first surface 207 and are in communication with the lens mounting hole. The number of the first screw holes 202 is greater than or equal to two. In this embodiment, the number of the first screw holes 202 is two, and the two first screw holes 202 are arranged around the lens mounting hole. The second screw holes 206 are defined in the second surface 208 and spaced apart from the lens mounting hole. The number of the second screw holes 206 is greater than or equal to one. In this embodiment, the number of the second screw holes 206 are three, and the three second screw holes 206 are arranged around the lens mounting hole.

The holder 200 further includes a supporting platform 203, a location guiding sleeve 204 and internal threads 205. The supporting platform 203, the location guiding sleeve 204 and the internal threads 205 are formed on the inner side wall 210 and are sequentially arranged along a direction form the first surface 207 toward the second surface 208. The supporting platform 203 is formed by defining a recess recessed from the first surface 207 toward the second surface 208. The supporting platform 203 abuts against the third surface 104 of the limit ring 101 (as shown in FIG. 2) to ensure that the lens 100 stops at the proper position after being screwed into the holder 200. The location guiding sleeve 204 is cooperated and mounted with the location guiding step 102 of the lens 100. The location guiding sleeve 204 and the location guiding step 102, by a transition fit therebetween, guide the lens 100 to be screwed in the holder 200, thereby facilitating the assembly of the lens and the holder and effectively ensuring the accuracy of the assembly. The internal threads 205 are configured to cooperate with the external threads 103 of the lens 100. When the external threads 205 are screwed with the internal threads 103, the external threads 205 and the internal threads 103 are in clearance fit to achieve a tight connection. In addition, the holder 200 further includes an annular boss 209 connected to the location guiding sleeve 204. The annular boss 209 surrounds to form a portion of the lens mounting hole. The internal threads 205 are disposed on the annular boss 209.

With reference to FIG. 1, the self-locking screws include one or more first self-locking screws 400 and one or more second self-locking screws 500. The first self-locking screws 400 are installed in the first screw holes 202. The first self-locking screws 400 press and fix the lens 100 onto the holder 200 by abutting the fourth surface 105 of the limit ring 101. The second self-locking screws 500 are installed in the second screw holes 206 and configured to fasten the image sensor assembly 300 and the holder 200. In order to fasten the lens 100 to the holder 200 more stably, two first self-locking screws 400 (as shown in FIG. 1) are symmetrically provided. In other embodiments, there may be a number of first self-locking screws 400 provided, the number of the first self-locking screws 400 is at least two. Threads of the first self-locking screw 400 are provided with thread locking adhesive, a top nut of the first self-locking screw 400 is relatively large, and the lens 100 is compressed by the engagement of the first self-locking screws 400 with the first screw holes 202. The first self-locking screws 400 are set to ensure that the lens 100 has no space for axial movement, thereby improving the stability of the engagement of the lens 100 with the holder 200 and facilitating subsequent rework and maintenance procedures.

With reference to FIG. 1, the holder 200 is further provided with one or more positioning posts 201. The positioning posts 201 may be cylindrical, the number of the positioning posts 201 may be two, and the two positioning posts 201 are respectively located at two opposite sides of the lens mounting hole. The positioning posts 201 are configured to assemble the holder 200 onto a device product. The device product may be a communication device such as a mobile phone and a tablet computer, the device product also may be a camera module of a vehicle camera, a surveillance camera, or a drone. The camera module 10 is mounted on the device product through the positioning posts 201 to realize a shooting function of the device product.

Specifically, the holder 200 is made of a metal material, which can be selected from materials with light weight, moderate price, and good elastic strain and plastic strain capabilities, such as aluminum alloy.

Figure 5:
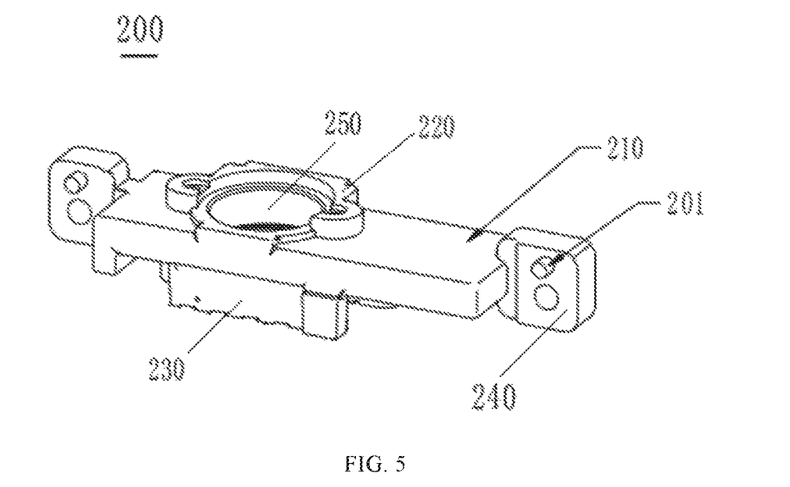
FIG. 5 is a schematic structural diagram showing the structure of the holder of the camera module, according to an embodiment of the disclosure.
Figure 6:
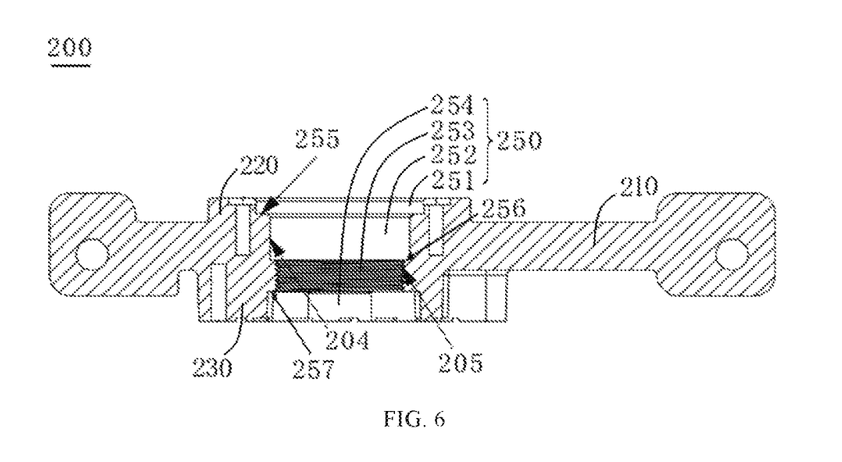
FIG. 6 is another cross-sectional diagram of the holder of the camera module, according to an embodiment of the disclosure.

As shown in FIG. 5 and FIG. 6, the structure of the holder 200 can also be described as follows. The holder 200 includes a main body 210, an abutting boss 220, an attaching boss 230 and two aligning parts 240. The two aligning parts 240 are connected at two opposite sides of the main body 210, and the two positioning posts 201 are disposed on the two aligning parts 240, respectively. A longitudinal direction of the positioning post 201 is substantially perpendicular to the aligning part 240. The abutting boss 220 and the attaching boss 230 are protruded from two opposite sides of the main body 210, respectively. The holder 200 defines the lens mounting hole 250 and at least one first fixing hole. The lens mounting hole 250 is a through hole and penetrates through the abutting boss 220, the main body 210 and the attaching boss 230. The at least one first fixing hole may be the first screw hole 202 or any other holes for fixing. The lens mounting hole 250 sequentially includes a supporting portion 251, a positioning portion 252, a screw portion 253 and a receiving portion 254 arranged along a direction from the first surface 207 to the second surface 208. The limit part 112 is received in the supporting portion 251. The positioning part 113 is received in the positioning portion 252. The screw portion 253 is engaged with the screw part 114. The exposed part 111 is exposed from the holder 200. The at least one first fixing hole, e.g., the first screw hole 202, is substantially in parallel with and adjacent to the lens mounting hole 250. The optical axis of the lens 100 coincides with a central axis of the holder 200. The optical axis of the lens 100 is perpendicular to the longitudinal direction of the positioning post 201. A diameter of the supporting portion 251 is greater than a diameter of the positioning portion 252, so the holder 200 includes a first supporting surface 255 exposed in the supporting portion 251, the first supporting surface 255 is perpendicular to a central axis of the lens mounting hole 250 and is in contact with the limit part 112 of the lens 100. A diameter of the positioning portion 252 is greater than a diameter of the screw portion 253, a diameter of the receiving portion 254 is greater than a diameter of the screw portion 253, so the holder 200 further includes a second supporting surface 256 exposed in the positioning portion 252 and a third supporting surface 257 exposed in the receiving portion 254, both of the second supporting surface 256 and the third supporting surface 257 are perpendicular to the central axis of the lens mounting hole 250. The positioning portion 252 and the positioning part 113 are in transition fit, and the screw portion 253 and the screw part 114 are in clearance fit.

The camera module 10 may also include at least one first fastener cooperated with the first fixing hole. The first fastener may be the first self-locking screw 400, a pin, a countersunk head screw, a cap screw or any other suitable fixing/positioning elements. A central axis of the first fastener is parallel with an optical axis of the lens 100. The first fastener comprises an abutting part and an inserting part connected with the abutting part. The abutting part may be a nut part 401, the abutting part abuts against the limit part 112 and the abutting boss 220, the inserting part may be a screwing part 402, the inserting part inserts into and engages with the at least one first fixing hole. The holder 200 may define at least one second fixing hole exposed from the second surface 208, the second fixing hole may be the second screw hole 206.

Figure 7:
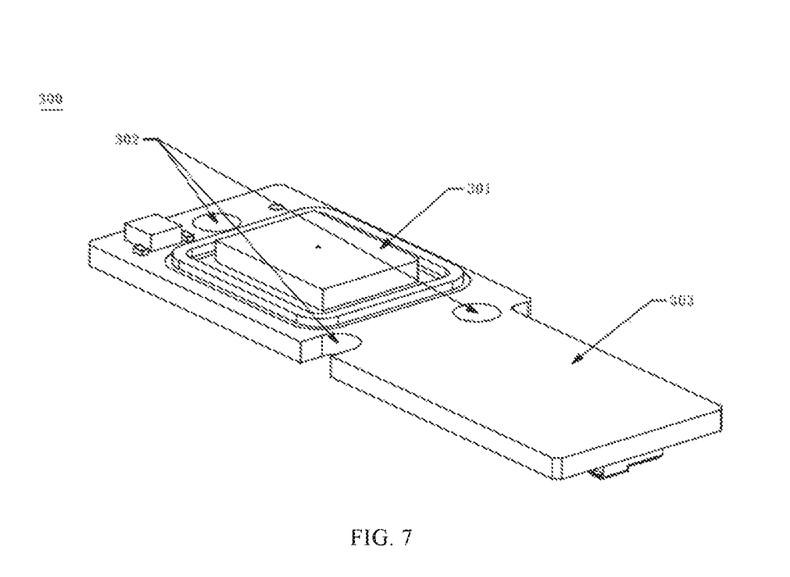
FIG. 7 is a schematic structural diagram showing the structure of an image sensor assembly of the camera module, according to an embodiment of the disclosure.

FIG. 7 is a schematic structural diagram of the image sensor assembly 300 according to an embodiment of the disclosure. The image sensor assembly 300 consists of an image sensor 301 and a circuit board 303 attached and mounted together. One or more through holes 302 are provided corresponding to the second screw holes 206 (as shown in FIG. 4). In order to fix the holder 200 and the image sensor assembly 300 more firmly, the number of the second self-locking screws 500 (as shown in FIG. 1) can be three. In other embodiments, the number of the second self-locking screws 500 can be at least one. The second screw holes 206 and the through holes 302 are corresponding to the second self-locking screws 500, so that the second self-locking screws 500 pass through the through holes 302 of the image sensor assembly 300 and then engage with the second screw holes 206 of the holder 200. In addition, a bonding medium can be filled between the second self-locking screw 500 and the image sensor assembly 300 to form an elastic connection there between. The bonding medium may be selected from one or more from the group consisting of Aron Alpha (AA) glue, thermosetting glue (e.g., Ultraviolet thermosetting glue), epoxy resin, pressure-sensitive glue, and light curable adhesive (Ultraviolet curable adhesive). The second self-locking screws 500 are provided to effectively avoid the problem of adhesive bonding failure caused by vibration, water immersion, high temperature, and the like, thereby improving the stability of the engagement of the holder 200 with the image sensor assembly 300.

In other words, the circuit board 303 defines at least one fixing through hole corresponding to the second fixing hole, the fixing through hole may be the through hole 302, The camera module 10 further comprises at least one second fastener, the at least one second fastener may be the second self-locking screw 500, a pin, a countersunk head screw, a cap screw or any other suitable fixing/positioning elements. The second fastener passes through the at least one fixing through hole of the circuit board 303 and engaged with the at least one second fixing hole. A central axis of the second fastener is parallel with an optical axis of the lens 100.

Figure 8:
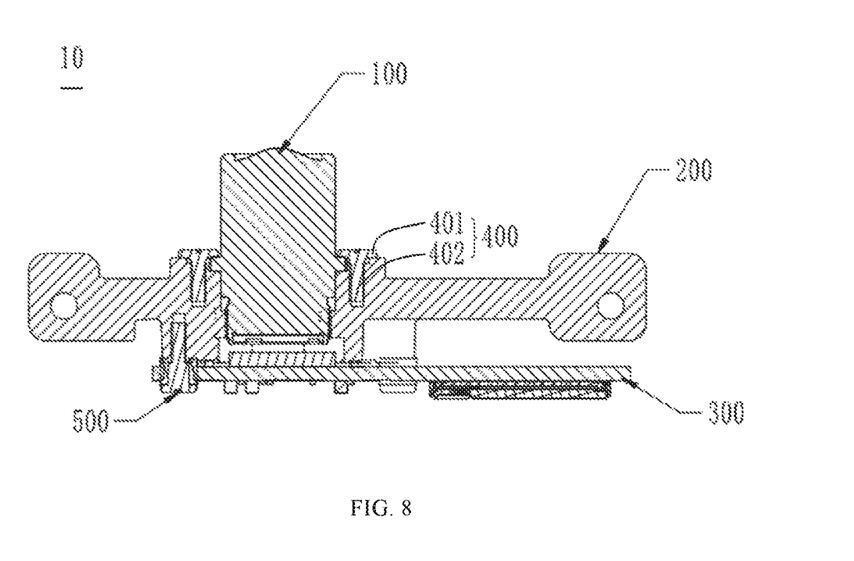
FIG. 8 is a cross-sectional diagram of the camera module according to an embodiment of the disclosure.

Assembling processes of the camera module 10 of the disclosure are described as follows, with reference to FIG. 8.

(1) A holder 200 (shown in FIG. 4) is provided. The holder 200 includes the first surface 207 and the second surface 208, the first surface 207 and the second surface 208 are opposite. The holder 200 also includes the inner side wall 210, the inner side wall 210 defines and forms the lens mounting hole, the lens mounting hole penetrates from the first surface 207 to the second surface 208. Several screw holes are defined in the holder 200. The holder 200 further includes the supporting platform 203, the location guiding sleeve 204 and the internal threads 205, the supporting platform 203, the location guiding sleeve 204 and the internal threads 205 are formed on the inner side wall 210 and are sequentially arranged along a direction from the first surface 207 toward the second surface 208. The supporting platform 203 is formed by recessing from the first surface 207 toward the second surface 208.

(2) A lens 100 (shown in FIG. 2) is provided. The lens 100 includes the outer side wall 106, the external threads 103, the location guiding step 102 and the limit ring 101. The external threads 103, the location guiding step 102 and the limit ring 101 are disposed on the outer side wall 106, the location guiding step 102 is located between the external threads 103 and the limit ring 101. The limit ring 101 includes a third surface 104 and a fourth surface 105, the third surface 104 faces the location guiding step 102, and the fourth surface 105 is opposite to the third surface 104.

(3) The lens 100 is screwed into the lens mounting hole via the location guiding sleeve 204, and the external threads 103 and the internal threads 205 cooperate with each other to tighten. When the third surface 104 of the limit ring 101 abuts against the supporting platform 203, the lens 100 and the holder are tightly clamped in the axial direction.

(4) One or more first self-locking screws 400 (shown in FIG. 1) are provided and screwed into corresponding screw holes of the holder 200. When the first self-locking screws 400 are pressed against the fourth surface 105 of the limit ring 101, the lens 100 and the holder 200 are fixedly connected.

(5) The image sensor 301 (shown in FIG. 7) and the circuit board 303 are provided, and the image sensor 301 is mounted on a surface of the circuit board 303 thereby forming the image sensor assembly 300.

(6) The image sensor assembly 300 is disposed on the second surface 208 of the holder 200, and then a glue dispensing process is performed, so that the image sensor 301 is accommodated in the lens mounting hole. The position of the image sensor assembly 300 is adjusted by auto-focusing technology and auto-centering technology, so that the focus of the lens 100 coincides with the center of the image sensor 301, the optical axis of the lens 100 coincides with the center normal of the image sensor 301.

(7) The glue between the holder 200 and the image sensor assembly 300 is cured by backing.

(8) One or more second self-locking screws 500 (shown in FIG. 1) are provided. The one or more second self-locking screws 500 pass through the image sensor assembly 300 and screw into corresponding screw holes of the holder 200. Adhesive medium is filled between the image sensor assembly 300 and the second self-locking screws 500 thereby forming an elastic connection. The image sensor assembly 300 is fixedly attached to the holder 200 by the second self-locking screws 500, and so the camera module 10 is assembled.

Specifically. FIG. 8 illustrates a schematic cross-sectional view of the assembled camera module 10. When assembling, firstly the holder 200 is placed in a positioning fixture, the holder 200 is fixed and positioned, then the lens 100 is screwed into the lens mounting hole of the holder 200, next a screwdriver is used to screw the one or more first self-locking screws 400 into the corresponding screw holes of the holder 200. The screw holes include the first screw holes 202 exposed from the first surface 207. By installing the first self-locking screws 400 in the first screw holes 202, the lens 100 is fixed in the holder 200 by a pressing force of the first self-locking screws 400, thereby achieving a stable connection between the lens 100 and the holder 200.

After assembling the lens 100 into the holder 200, the optical axis of the lens 100 relative to the positioning posts 201 at two opposite sides thereof can meet size requirements of positioning datum. The image sensor assembly 300 is disposed on the second surface 208 of the holder 200, and glue is filled therebetween. The image sensor assembly 300 is adjusted to a proper position through auto-focusing technology and auto-centering technology to realize that the focus of the lens 100 is coincided with the center of the image sensor 301 and the optical axis of the lens 100 is coaxial with the center normal of the image sensor 301. Then the glue is cured, so that the image sensor assembly 300 is attached onto the second surface 208 of the holder 200. Considering that thermal curing glue may have the risk of failure, one or more second self-locking screws 500 are provided. The second self-locking screws 500 are screwed into screw holes of the holder 200, and the screw holes of the holder 200 includes the one or more second screw holes 206. By installing the second self-locking screws 500 in the second screw holes 206, the image sensor assembly 300 is fixedly attached on the second surface 208 of the holder 200. The adhesive medium is filled between the second self-locking screws 500 and the image sensor assembly 300 to form an elastic connection therebetween, thereby achieving the purpose of assembling the camera module 10 with particular positioning requirements. The adhesive medium can be one or more selected from the group consisting of Aron Alpha (AA) glue, thermosetting glue (e.g., ultraviolet thermosetting glue), epoxy glue, pressure sensitive glue, light curing glue (e.g., ultraviolet curing glue).

Figure 9:
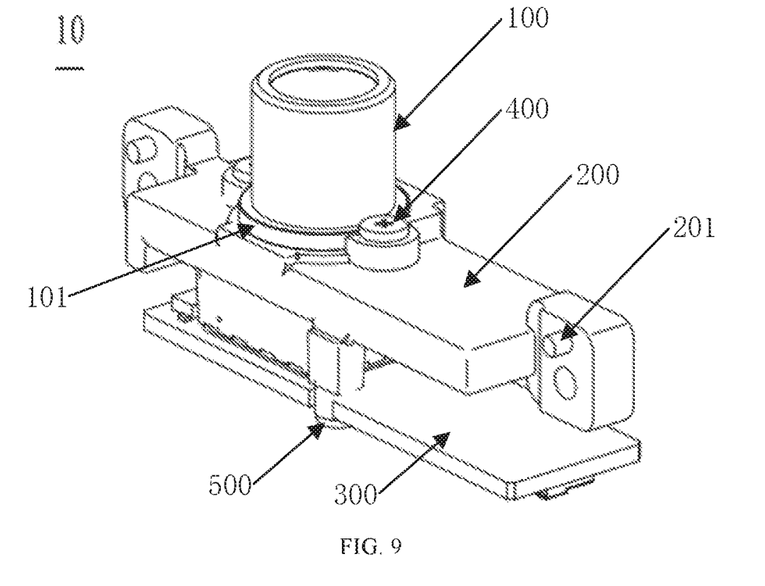
FIG. 9 is a schematic structural diagram of the camera module according to an embodiment of the disclosure.

FIG. 9 illustrates a schematic structural diagram of the assembled camera module 10. The camera module 10 is assembled by the above processes, that is, first the lens 100 and the holder 200 is fixedly assembled to ensure the optical axis of the lens 100 is consistent with respect to a reference position of the positioning posts 201 of the holder 200, then the holder 200 is used as a reference to adjust the image sensor assembly 300 to a proper position and fix it to the second surface 208 of the holder 200, thereby ensuring that the optical axis of the lens 100 coincides with the center normal of the image sensor 301, meeting size requirements relative to the positioning reference, and ensuring the consistency of the camera module 10 when used in the assembly of the device product.

The camera module 10, the device product, and the assembling method of the camera module 10 provided by the disclosure have at least the following advantages.

(1) Components of conventional camera modules are assembled based on a surface of the circuit board, however, they are assembled based on the holder 200 in the application. This reduces flatness and centrality requirements of the image sensor 301 installed on the circuit board 303, and further effectively reduces the assembly difficulty and facilitates manufacturing.

(2) Self-locking screws are used in the application, this can effectively avoid the problem of glue failure caused by vibration, high temperature, etc., ensure that the lens 100 and the image sensor assembly 300 both are stably engaged with the holder 200, and facilitates rework, repair and other later processes.

(3) In the assembly processes of the camera module 10, the lens 100 is firstly assembled with the holder 200, so it is ensured that the optical axis of the lens 100 is consistent with respect to the reference position of the positioning posts 201 of the holder 200, and the consistency of the camera module 10 assembled with the device product is also ensured.

(4) The assembly processes of the camera module 10 effectively improve the coaxiality between the center normal of the image sensor 301 and the optical axis of the lens 100, that is, the optical axis of the lens 100 coincides with the normal of the image sensor 301, thereby improving the yield of the camera module 10.

The above-mentioned embodiments describe the implementation of the present disclosure, and the description is relatively specific and detailed, but is should not be understood as limitations to the scope of the disclosure. It should be noted that various variations and modifications may be made by those skilled in the art without departing from the spirit and scope of the disclosure. Therefore, the scope of the disclosure should be determined by the appended claims.

What is claimed is:

1. A camera module, comprising:
   a holder, wherein the holder comprises a first surface, a second surface and a lens mounting hole penetrating through the first surface and the second surface, the lens mounting hole comprises a supporting portion, a positioning portion, a screw portion and a receiving portion arranged along a direction from the first surface to the second surface, the holder comprises a first supporting surface exposed in the supporting portion; the holder defines at least one first fixing hole exposed from the first surface, and the at least one first fixing hole is in communication with the supporting portion of the lens mounting hole;
   a lens, assembled with the holder, wherein the lens sequentially comprises an exposed part, a limit part, a positioning part and a screw part, the exposed part is exposed from the holder, a diameter of the limit part is greater than a diameter of the exposed part, the limit part is received in the supporting portion and abuts against the first supporting surface, the positioning part is received in the positioning portion, the screw part is engaged with the screw portion;
   an image sensor assembly, comprising an image sensor and a circuit board, wherein the circuit board is attached on the second surface of the holder, the image sensor is assembled on the circuit board and received in the receiving portion; and
   at least one first fastener engaged with the at least one first fixing hole: the first fastener comprises a nut part and a screw part, the nut part abuts against the first surface and the limit part, and the screw part is screwed and engaged in the first fixing hole.

2. The camera module of claim 1, wherein a central axis of the first fastener is parallel with an optical axis of the lens.

3. The camera module of claim 1, wherein the first fastener is a self-locking screw.

4. The camera module of claim 1, wherein the holder defines at least one second fixing hole exposed from the second surface, the circuit board defines at least one corresponding fixing through hole, the camera module further comprises at least one second fastener, the at least one second fastener passes through the at least one fixing through hole of the circuit board and engaged with the at least one second fixing hole.

5. The camera module of claim 4, wherein a central axis of the second fastener is parallel with an optical axis of the lens group.

6. The camera module of claim 1, wherein a diameter of the supporting portion is greater than a diameter of the positioning portion, the first supporting surface is perpendicular to a central axis of the lens mounting hole and is in contact with the limit portion of the lens.

7. The camera module of claim 1, wherein a diameter of the positioning portion is greater than a diameter of the screw portion, a diameter of the receiving portion is greater than a diameter of the screw portion, the image sensor is spaced from and coaxial with the lens.

8. The camera module of claim 7, wherein the holder comprises a second supporting surface exposed in the positioning portion and a third supporting surface exposed in the receiving portion, both of the second supporting surface and the third supporting surface are perpendicular to a central axis of the lens mounting hole.

9. The camera module of claim 1, wherein the positioning portion and the positioning part are in transition fit, and the screw portion and the screw part are in clearance fit.

10. The camera module of claim 1, wherein the holder further comprises one or more positioning posts configured for mounting on a device, and a longitudinal direction of the positioning post is perpendicular to an optical axis of the lens.

11. The camera module of claim 6, wherein the limit part comprises a third surface and an opposite fourth surface, the third surface abuts against the first supporting surface, there are two first fixing holes defined in the holder and exposed from the first surface, the at least two first fixing holes are in communication with the lens mounting hole and surround the lens mounting hole, there are at least two first fasteners, the at least two first fasteners abut against the fourth surface and the first surface and engaged with the at least two first fixing holes.

12. The camera module of claim 3, wherein an adhesive medium is filled between the at least one second fastener and the at least one fixing through hole of the circuit board.

13. A camera module, comprising:
   a lens, comprising a barrel and a lens group, the lens group being accommodated in the barrel, the barrel comprising a screw part, a main portion and a limit ring, the screw part being connected with a bottom of the main portion, the limit ring protruding from an outer surface of the main portion; the limit ring comprises a third surface and an opposite fourth surface;
   a holder, comprising a main body, an abutting boss, and an attaching boss, the abutting boss and the attaching boss being protruded from two opposite sides of the main body, the holder defining a mounting through hole and at least one first fixing hole, the mounting through hole sequentially penetrating through the abutting boss, the main body and the attaching boss, the mounting through hole comprising a screw portion, a supporting portion, and a receiving portion, the screw portion engaged with the screw part, the supporting, portion and the receiving portion, being respectively located at two opposite sides of the screw portion, the at least one first fixing hole being in communication with the supporting portion of the mounting through hole the holder comprises a first supporting surface exposed in the supporting portion, the third surface of the limit ring abuts against the first supporting surface;

an image sensor assembly, comprising an image sensor and a circuit board, the image sensor being opposite to the lens group and mounted on the circuit board, the image sensor being received in the receiving portion, the circuit hoard being attached on the attaching boss; and at least one first fastener, comprising an abutting part and an inserting part connected with the abutting part, the abutting part abutting against the fourth surface of the limit ring and the abutting boss, the inserting part inserting and engaging into the at least one first fixing hole.

14. The camera module of claim 13, wherein the main portion comprises a positioning part and an exposed part, the limit ring is positioned between the positioning part and the exposed part, the mounting through hole further comprises a positioning portion located between the supporting portion and the screw portion, the positioning portion and the receiving portion are both in communication with the screw portion, the positioning part is engaged in the positioning portion.

15. The camera module of claim 14, wherein a diameter of the supporting portion is greater than a diameter of the positioning portion, a diameter of the positioning portion is greater than that of the screw portion.

16. An assembling method for a camera module, comprising:

providing a holder, wherein the holder comprises a first surface, a second surface and a lens mounting hole penetrating through the first surface and the second surface, the lens mounting hole comprises a supporting portion, a positioning portion, a screw portion and a receiving portion arranged along a direction from the first surface to the second surface; a diameter of the supporting portion is greater than a diameter of the positioning portion the holder comprises a first supporting surface exposed in the supporting portion: the holder defines at least two first fixing holes exposed from the first surface, the at least two first fixing holes are in communication with the supporting portion of the lens mounting hole and surround the lens mounting hole;

providing a lens, wherein the lens sequentially comprises an exposed part, a limit part, a positioning part and a screw part; the limit part protruding from an outer surface of the exposed part; wherein the limit part comprises a third surface and an opposite fourth surface;

screwing the lens into the lens mounting hole, wherein the exposed part is exposed from the holder, the limit part is received in the supporting portion and abuts against and contacted with the first supporting surface, the third surface abuts against the first supporting surface: the positioning part is engaged in the positioning portion, the screw part is engaged with the screw portion;

assembling an image sensor on a circuit board thereby forming an image sensor assembly; and attaching the circuit board on the second surface of the holder, wherein the image sensor is accommodated in the receiving portion, and the focus of the lens coincides with the center of the image sensor;

providing and screwing at least two first fasteners into the at least two first fixing holes respectively; wherein the at least two first fasteners abut against the fourth surface and the first surface and engaged with the at least two first fixing holes.

17. The camera module of claim 1, wherein a central axis of the first fixing hole is parallel with a central axis of the lens mounting hole.

18. The camera module of claim 13, wherein there are at least two first fixing hole defined in the holder, the at least two first fixing holes are in communication with the lens mounting hole and surround the lens mounting hole; there are at least two first fasteners engaged with the at least two first fixing hole respectively; the at least two first fasteners abut against the fourth surface and the abutting boss.

19. The camera module of claim 14, wherein the positioning portion and the positioning part are in transition fit, and the screw portion and the screw part are in clearance fit.

20. The camera module of claim 13, wherein the holder further comprises one or more positioning posts configured for mounting on a device, and a longitudinal direction of the positioning post is perpendicular to an optical axis of the lens.

* * * * *